United States Patent [19]

Pelikan et al.

[11] 4,104,207

[45] Aug. 1, 1978

[54] PROCESS FOR PRODUCTION OF CELLULAR CAVITIES IN THERMOPLASTIC MATERIAL IN WHICH THE MEDIUM WHICH FORMS THE GAS BUBBLES IS BOUND TO A CARRIER

[75] Inventors: Hans Dieter Pelikan, Am Prinzenwaldchen 13; Siegfried Titz, Im Laar 25, both of 521 Troisdorf, Germany

[73] Assignees: Hans Dieter Pelikan; Siegfried Titz, Germany

[21] Appl. No.: 673,528

[22] Filed: Apr. 5, 1976

[30] Foreign Application Priority Data

Apr. 4, 1975 [DE] Fed. Rep. of Germany ....... 2514691

[51] Int. Cl.$^2$ ............................................... C08J 9/12
[52] U.S. Cl. ...................................... 521/84; 521/91; 521/145
[58] Field of Search .......... 260/2.5 E, 2.5 AK, 2.5 R, 260/2.5 HA, 2.5 HB

[56] References Cited

U.S. PATENT DOCUMENTS

| 3,138,478 | 6/1964 | Hedman et al. | 260/2.5 R |
| 3,502,754 | 3/1970 | Fehn | 260/2.5 E |
| 3,962,157 | 6/1976 | Nakano et al. | 260/2.5 R |

*Primary Examiner*—M. J. Welsh
*Attorney, Agent, or Firm*—Craig & Antonelli

[57] ABSTRACT

A process for forming a foamed thermoplastic material in which a carrier member made, for example, of a vegetable material such as lignocellulose-containing fibers or cork particles, and having bonded thereto, by either capillary bonding or molecular bonding, a gas bubble forming medium, such as water or aqueous dispersions, is added to the plastic material, whereby, when the temperature of the plastic is raised above the temperature at which the medium forms bubbles, gas bubbles, are formed and form cavities in the plastic. The carrier can also act as a reinforcing agent for the plastic.

35 Claims, No Drawings

PROCESS FOR PRODUCTION OF CELLULAR CAVITIES IN THERMOPLASTIC MATERIAL IN WHICH THE MEDIUM WHICH FORMS THE GAS BUBBLES IS BOUND TO A CARRIER

The subject of the invention relates to a process for production of cell cavities in thermoplastic plastic materials and plastic molding compositions, a foamed plastic produced in this process, and its application.

Foamed plastics are produced either by pressureless foaming (mechanically, or by means of foaming agents) or by the sudden expansion of gases, expanding agents or solvents, which at higher temperatures elicit an expanding pressure in the plastic or liquid plastic mass. The cells may be closed or open, i.e. they are interconnected. The manufacture of foamed plastics, depending upon various considerations in various field of application, is brought about with quite different structural and material properties in the individual foamed plastics. One aspect, involving addition of expanding agents to the thermoplastic plastics consists in reduction of the amount of material that is used, by formation of cavities. Since however the cell cavities limit the strength of the foamed plastics, as compared to that of solid plastics, the field of utilization of foamed plastics as opposed to solid plastics is limited, with this consideration. For example, extruded shaped pieces with complicated cross section, especially thin-walled cross sections, hollow chamber shapes etc made of foamed plastic have very low mechanical strength, so that for example hollow shaped pieces of foamed plastic are not extruded. However, the total utilization of material with the same external configuration in a solid plastic hollow shaped piece, as compared to the same shape fully foamed as foamed plastic, is almost the same, and there are only slight savings of material with use of foamed plastic for production of equivalently shaped pieces, if it is even possible.

In the processing of foamed plastics, special techniques are necessary, in consideration of the expanding agent that is used, said technique offering a limited economy. The rheology of plastic materials that contain expanding agents in production of complicated shaped with rather large cross sections leads, for example, to irregularities in the distribution of the formed cell cavities, and thereby to an impairment and irregularity of the strength coefficients in the shaped piece.

The present invention is addressed to the problem of creating a foamed plastic with closed-cell structure which has a higher coefficient as compared to known foamed plastics, suitable for extrusion of complicated cross sections, especially of hollow-configuration cross sections.

According to the invention, this problem is solved in that the medium that forms the gas bubbles is bound in a vehicle and added to the plastic along with the said vehicle. The binding of the medium to the carrier can be molecular and/or capillary.

The selected type of binding of the medium to the vehicle according to the invention is preferably characterized in that the development of the cellular cavities in the thermoplastic plastic material at ambient air pressure will only be initiated if the temperature of the thermoplastic material rises above the value that normally marks the boiling point of the medium that forms the bubbles of gas.

A further aspect of the invention with reference to the type of binding so sets the marking point that onset of the transition to the gaseous phase occurs at the earliest when a processing temperature of 120° C is exceeded by the plastic material, at ambient pressure. This means therefore that for better production of cell cavities according to the invention, a medium is used that, because of the type of its binding in the plastic mixture, only begins to go over into the gaseous phase if the temperature of the plastic mixture and possibly fillers etc, especially in extrusion, clearly rises in the processing above 120° C at ambient air pressure, and then develops such a high gas pressure that cellular cavities with regular distribution and optimal size are formed even in a thermoplastic material that is heavily charged, i.e. with fillers. The carrier material used for the so-called expanding agent for formation of cell cavities in the thermoplastic material, namely the medium that forms gas bubbles, may be at the same time a filler in the plastic material. The binding of the medium to the carrier material must be so thorough that unintentional gassing cannot occur. An economical medium in application of the invention is water, for example, or aqueous dispersions. Since however these have a lower boiling point than the temperatures that are usual in processing of thermoplastic materials, according to the invention the temperature that marks the boiling point of the medium at normal air pressure, e.g. that of water, must not be reached before the temperature of the thermoplastic material in the progressive stage of plasticizing and formation is distinctly above the boiling point of water. This, as already indicated, is achieved in the invention by having the medium, in this case the aqueous medium, in a molecular and/or capillary bond, preferably to a vehicle with poor thermal conductivity. Vegetable carriers are particularly suitable, for example lignocellulose-containing fibers. Lignocellulose-containing fibers have poor thermal conductivity and they allow molecular and capillary binding of water. As a consequence of the poor thermal conductivity of lignocellulose containing fiber, its water content is gasified only when the temperature of the plastic material to which the fibers are added arrives well above the boiling point of water, in the course of plasticizing. If there is to be unbound water in the composition, after the boiling point is reached, it can be led off at the surface, for example in the working in the extruder, by degassing. If now the thermoplastic composition, to which the water-containing lignocellulose-containing fibers are added, is heated during plasticizing above the boiling point of water, it is the water that has a capillary bond in the lignocellulose-containing fibers that is gasified first, and the molecularly bound water is gasified in the final stage of heating. Since relatively small, finely divided amounts of water are involved in the binding of water to the individual fibers, which as a consequence of mixing with the thermoplastic material and the temperatures necessary for the plasticizing thereof, are gasified at 180° C and above, with high vapor pressure, small closed cell cavities are created, with regular distribution in the plastic material. Since at the rather high processing temperatures for the thermoplastic material, a corresponding high gas pressure is established, this has the effect that small cellular cavities are formed even in plastic materials with a high filler content, and at the same time the so-called dispersion hardening is enhanced. The high gas pressure has the further effect that there is a firm binding of the thermoplastic material, i.e. of the polymers with the fibers. This is particularly important on account of the strength coefficients that are attainable in the plastic with cellular cavities, because the cellular cavities and the fillers essentially lower the strength coefficients of thermoplastic plastic materials, since the molecular cross linking is disturbed by the cellular cavities and the fillers. On the contrary, cellulose-containing fibers contribute to the reinforcing of the plastic structure, because they themselves have the character of correspondingly mutually bound chain molecules, and thereby they bridge the molecular cross links of the polymers that are disturbed by the cellular cavities and fillers. In this way therefore the vehicles for the gas bubble forming medium may be utilized at the same time for the reinforcement of the plastic material. Here the strength coefficient of the reinforced plastic can be adjusted according to the content, properties and dimensions of the carrier elements. A vehicle is preferred that is a material in the solid phase, in particulate form, of any configuration.

The formation of cellular cavities in the thermoplastic material according to the invention can also be effected with a medium that is bound by the carrier and consists of a dispersion, of fluids with different boiling points. In this way the medium that forms the gas bubbles in the plastic material in the course of its processing and heating will be fractionally gasified, whereby this fractionated gasification will be further differentiated by the molecular and capillary binding to the vehicle. This has the effect that there will be a very fine continuous formation of gas bubbles, and therewith a very even distribution. Especially, the formation of small gas bubbles will be promoted.

In addition to the lignocellulose-containing fibers already mentioned, other particles may be used as carrier material, for example cellulose-containing fibers, cork particles and bast fibers from tree bark etc., individually or in combination.

The process of the invention for the production of cellular cavities in thermoplastic plastic materials is preferably combined with extrusion thereof, for the manufacture of shaped parts, pieces, plates, webs or the like.

An essential advantage of the process of the invention resides in the fact that in the processing, for example for extrusion of such materials consisting of plastics, fillers, additives and vehicle material with gas bubble forming medium, there need be no particular open times or "pot life". Rather large charges of the material composition can be prepared continuously and led discontinuously through the bunker that serves for intermediate storage to processing.

This advantage is achieved by keeping the concentration of the medium that forms the cellular cavities by gasification in the carrier material, for example the lignocellulose-containing fibers, below the threshold at which these fibers begin to release their moisture to the ambient air. This threshold is determined by the vapor pressure of the atmosphere in question, and is adjustable in closed systems.

A further advantage of the process of the invention resides in the fact that the development of the cellular cavities cannot inhibit the formation process in workup.

In the extrusion of complicated multi-chambered shaped pieces with large cross section, an acceptable flow of the material composition into the tool is of great importance. The development of the cellular cavities must not hinder the flow of material into the tool, and there must not be an accumulation of cellular cavities in any place in the cross section of the shaped piece. This is managed because in the carrier material, for example the medium bound to the lignocellulose fibers only builds up the said cellular cavities by gasification if flow of material into the tool can no longer be prevented. The cellular cavities from the molecularly bound stage of the medium appear after those from the stage of capillary binding only when the material has been practically formed in the tool and has reached the maximum of compacting, and processing temperature.

The vapor pressure occurring in this processing phase supports the binding of the filler materials and the lignocellulose containing fibers to the polymers and in general the development of good strength coefficients in the manufactured plastic shape.

In extrusion the homogenizing of the material is not inhibited by undesirable early formation of gas bubbles. Delivery of heat e.g. in the screw can be adapted to this condition.

As filler for the plastic material, in addition to the carrier material, according to the invention it is suitable to use especially hydrophilic minerals that promote the maintenance of a specific equilibrium of the moisture content of the carrier material's gas bubble forming medium.

Obviously, according to the shaping process in question, and the utilization of the final product, other fillers may be used, also in combination.

Similarly according to the process, dyes, fire proofing agents, stabilizers and softeners etc may be added to the formula.

It is a quite essential advantage that the processing of the compositions according to the invention may be undertaken with the same apparatus and tools with which thermoplastic materials otherwise charged in the usual way without cellular cavities are worked.

There are therefore no supplementary special tools required for the shaping of for example multi-chambered pieces.

According to the invention, different properties of such shaped pieces can be varied. For example the volumetric weight of the manufactured product can be influenced by a corresponding content of the aqueous medium that develops the cellular cavities by gasification.

It is to be noted in this connection that material mixtures that are rather too moist can lead to undesired results, because their higher thermal conductivity cancels the heat-damming properties of the lignocellulose containing fibers and the gas bubble formation in the material would be initiated too soon.

The strength coefficients can be differentiatingly set by the content, character and length of the lignocellulose-containing fibers that are to be worked in. Here it is important to distribute the fibers uniformly in the material. They orient themselves during the processing, for example during plasticizing in a screw, in the flow direction of the material, and improve the bending rupture strength or the compression strength of soft plastics.

Depending upon the desired properties of hard or soft plastic products, manufactured according to the process of the invention, it may be advantageous — instead of the cellulose or lignocellulose containing fibers — to work in particles from the bark of the cork oak, or cork particles and bast fibers from the bark of those woods whose contents, in addition to colloidally bound water, support the expansion process and allow it to proceed in a differentiated way.

Since here the expansion process that results from the heating of the cork particles of the materials occurs in the interior of said particles, they become closely connected to the surrounding thermoplastic mass by the gas pressure, and intimately incorporated therein.

According to the invention, the differentiatingly adjustable expansion process with such cork bark particles improves especially soft-adjusted plastic extrusion products, in their elasticity and compression strength.

Thereby there are advantages for example for floor coverings and soft shaped pieces of this nature that have to absorb and balance dynamic loads.

Since bark cork particles of this kind have a low reinforcing effect, it is advantageous to work in bark bast fibers particularly, into the composition. They have a balancing effect. In comparison to cellulose or shredded wood, these bark bast fibers have substantially higher strength coefficients. Bark cork and bark bast occur as waste products, in large quantities, in wood debarking for paper and pulp manufacture.

In line with the two previously mentioned characteristics of the cellular cavities and the reinforcement, the necessary filler content can be made optimal.

Fiber reinforcements and fillers, depending upon their quantity, can lead in certain circumstances to structured surfaces with distinct longitudinal orientation.

With the process of the invention therefore, it is possible to produce an extrudable thermoplastic foamed plastic or foamed plastic molding composition with closed cellular cavities, characterized by a content, in the form of finely divided particles, of a carrier with poor thermal conductivity that can bind a gas bubble forming medium by capillary and/or molecular binding. Such a foamed plastic is suitable for manufacture of shaped parts, shaped pieces, mats or webs, by extrusion. It is possible thereby to produce shaped parts from thermoplastic plastics with cellular cavities, which present an optimal content of fiber and extenders with good strength coefficients; this means that for example multichambered hollow shapes with large cross section and adequate strength coefficients can be produced, with a substantially reduced use of plastic materials, as opposed to shaped pieces without cellular cavities. Therewith moreover, the field of economical use of thermoplastic plastic materials is substantially broadened, with reduction of the utilization of plastic, which is of substantial economic importance, particularly in view of the increased cost and scarcity of such raw materials that are dependent upon petroleum.

According to the invention therefore, products can be manufactured with hard-adjusted or soft-adjusted plastics with various properties. Hard-adjusted shaped parts and plates, as contrasted to those without cellular cavities, have less weight, less thermal conductivity and less sound propagation, and only very slightly reduced strength. As opposed to pure foamed plastics prepared according to conventional processes, they present substantially higher strength coefficients, so that they can be utilized for bearing structures, which is excluded as far as conventional foamed plastics are concerned.

Soft-adjusted shaped parts, plates or webs according to the invention offer increased compression strength and variable properties of elasticity, which afford favorable values for the damping of the sound of foot-steps and for thermal insulation when they are used, for example, as floor covering.

For application of the process of the invention and manufacture of foamed plastic according to the invention, all thermoplastic and related plastics may be used, especially extrudable plastics, e.g. polyvinyl chloride, polyolefins, polyethylene, polypropylene, acrilonitrile butadiene styrene polymers or the like, whereby the plastic or plastic mixture may have added to it fillers, softeners, stabilizers, pigments, fireproofing agents etc in the known way. The added quantity of carrier material and of gas bubble forming agent therewith is exclusively dependent upon the desired volumentric weight, i.e. the proportion of cell cavities to total cross section and the desired strength coefficients. Preferably, to 100 % by weight plastic compound, 5 to 25% by weight carrier material, including the bubble forming agent, is added. The proportion of gas bubble forming agent is preferably 10 to 30 % by weight to 100% by weight carrier material.

1. Polyvinyl chloride, polyolefins, polyethylene, polypropylene, acrilobutadiene styrene polymers and mixtures of such plastics are used as extrudable plastics.

Fillers, softeners, stabilizes, pigments, fireproofing agents etc are added to the individual thermoplastic materials.

Examples of fillers are chalk, plaster, lime, slate dust, mica powder, pearl white, asbestos etc.

Hydrophilic mineral fillers are especially kaolin and alumina.

The proportion of filler material can be between 5 and 50% by weight calculated on the amount of thermoplastic material that is used. Preferably it should range between 10 and 30 % by weight. Hydrophilic mineral fillers and ordinary fillers may be added alone or as a mixture.

In provision for the addition of hydrophilic mineral materials, the proportion of such materials should range between 5 and 25% by weight calculated on the plastic material.

2. Carrier materials are preferably vegetable materials. Here rather large particles are involved, generally with a minimum diameter of 350 $\mu$ and a length of 1 to 8 mm. The proportion of vegetable substance, including water and gas bubble forming material should be between 5 and 25% by weight calculated on the utilized plastic material, including all fillers and ancillary agents.

The proportion of the gas bubble forming agent, i.e. water or aqueous dispersion, calculated on the carrier material, is 8 to 30% by weight to 100% by weight carrier material. Larger proportions of water or aqueous dispersions lead to irregular and unequal formation of cellular cavities.

3. The mixture that forms the gas bubbles is advantageously water. There may also be dispersions that consist for example of water and oil, water and alcohol, water and essential oils, and mixtures of these.

4. Example of a mixture of hard PVC, for extrusion:
   100 parts by weight S-PVC, K number 65 3 parts by weight lead sulfate, as stabilizer 1 part by weight lead stearate, as stabilizer 0.3 parts by weight calcium stearate, as stabilizer 1 part by weight epoxydized soy bean oil as lubricant 10 parts by weight calcium carbonate, as filler, with a specific area of ca 5 $m^2$ per gram
   1 part by weight titanium dioxide as pigment
   8 parts by weight lignocellulose fibers e.g. pine wood fibers, containing 10 parts by weight water
   Lb 16 parts by weight kaolin The above indicated mixture extruded in an ordinary single screw extruder at an exit temperature, i.e. extrusion temperature of about 250° C as plates or shaped elements. The extruded shaped parts had an average density of 0.8 grams per cc. As compared with the same plastic molding composition without addition of lignocellulose-containing fibers and without addition of kaolin, they have a density that is about 30% less. The density of the extruded plastic molding composition without lignocellulose containing fibers and kaolin is about 1.14 gram per cc. Thus there is a lighter material with good mechanical properties, because of fiber reinforcement. The reduction of the density of the material per the invention is to be attributed to the corresponding reduction of the amount of plastic, PVC in the example, with simultaneous formation of cellular cavities.

We claim:

1. A process for the production of cellular cavities in thermoplastic plastic material, said material being suitable for use as molding compositions or for extrusion, comprising addding to the material a carrier having bound thereto, by at least one of molecular bonding or capillary bonding, a medium which forms gas bubbles, the bond being such that there is direct communication between the medium and the material, whereby, when the temperature of the thermoplastic plastic material is above the minimum temperature at which the medium forms the gas bubbles, the bubbles are formed and act to produce cellular cavities in the thermoplastic plastic material.

2. Extrudable thermoplastic foamed plastic or molding compound with closed cellular cavities, including a content of a carrier comprising vegetable matter capable of effecting at least one of capillary and molecular bonding of a gas bubble forming medium selected from the group consisting of water and aqueous dispersions, the said carrier having poor thermal conductivity.

3. Foamed plastic as in claim 2, characterized in that the carrier of the gas bubble forming medium is uniformly distributed in the plastic material for reinforcement of the plastic material.

4. Foamed plastic as in claim 3, characterized in that the carrier is made of at least one material selected from the group consisting of lignocellulose-containing fibers, cellulose-containing fibers, cork particles, and bast fibers.

5. A process as in claim 2, wherein the carrier with the gas bubble forming medium is in the form of small particles.

6. A process for the production of cellular cavities in thermoplastic plastic material, said material being suitable for use as molding composition or for extrusion, comprising adding to the material a carrier comprised of vegetable matter and having bound thereto, by at least one of molecular bonding or capillary bonding, a medium which forms gas bubbles selected from the group consisting of water and aqueous dispersions, whereby, when the temperature of the thermoplastic plastic material is above the minimum temperature at which the medium forms the gas bubbles, the bubbles are formed and act to produce cellular cavities in the thermoplastic plastic material.

7. Process as in claim 6, characterized in that by virtue of the bonding of the medium, the formation of cellular cavities in the thermoplastic plastic compound at normal air pressure is only initiated after the temperature of the thermoplastic material has exceeded the temperature that normally marks the boiling point of the gas bubble forming medium.

8. Process as in claim 6, characterized in that the transition of the medium to the gaseous phase is initiated at the earliest upon the exceeding of a processing temperature of 120° C, of the plastic material at normal air pressure.

9. Process as in claim 6, characterized in that the medium is an aqueous dispersion, and the components of the aqueous dispersion present different boiling points.

10. Process as in claim 9, characterized in that the aqueous dispersion, whose components present different boiling points, is fractionally gasified, whereby different of these components of the aqueous dispersion, due to the different boiling points, form gas bubbles at different temperatures of the material.

11. Process as in claim 10, characterized in that a portion of the medium is bound by capillary bonding and a portion by molecular bonding, and that there is a further fractional gasification of the gas bubble forming medium due to this difference in bonding.

12. Process as in claim 6, characterized in that a carrier with poor thermal conductivity is used.

13. Process as in claim 6, characterized in that a carrier is used that comprises a material in the solid phase, in particulate form, of any desired configuration.

14. Process as in claim 6, characterized in that lignocellulose-containing fibers are used as carrier.

15. Process as in claim 6, characterized in that cellulose-containing fibers are used as carrier.

16. Process as in claim 6, characterized in that cork particles are used as carrier.

17. Process as in claim 6, characterized in that bast fibers from tree bark are used as carrier.

18. Process as in claim 6, characterized in that a plurality of different types of carriers are used together.

19. Process as in claim 6, characterized in that the gas bubble forming medium is bound in finely divided form in the carrier.

20. Process as in claim 6, characterized in that the carrier is used for reinforcement of the plastic material.

21. Process as in claim 20, characterized in that the the content, properties and dimensions of the carrier is used to adjust the strength coefficients of the material reinforced with the carrier.

22. Process as in claim 6, characterized in that the carrier with the gas bubble forming medium is uniformly distributed in the plastic material before gasification of the medium.

23. Process as in claim 6, characterized in that, additionally, hydrophilic mineral fillers for the plastic material, of the kind that promote the maintenance of a specific equilibrium of the moisture content of the gas bubble forming medium bound to the carrier, are added to the plastic.

24. Process as in claim 22, wherein the carrier with the gas bubble forming medium is in the form of small particles.

25. A process as in claim 6, wherein a temperature of the plastic above the temperature at which the medium forms the gas bubbles is produced, whereby cellular cavities are produced in the plastic, and the plastic material is extruded to form one of shaped parts, plates, webs, shaped pieces, and hollow-chambered shaped pieces.

26. A process as in claim 6, wherein a temperature of the plastic material above the temperature at which the medium forms the gas bubbles is produced, whereby cellular cavities are produced in the plastic.

27. The product produced by the process of claim 6.
28. The product produced by the process of claim 25.
29. The product produced by the process of claim 26.
30. A process as in claim 6, wherein the total weight of the carrier and the gas bubble forming medium added to the plastic material is 5–25% of the weight of the plastic material.
31. A process as in claim 6, wherein the gas bubble forming medium bound to the carrier is from 8 to 30% by weight of the weight of the carrier.
32. A process as in claim 6, whereby the medium is in direct communication with the material.
33. A process as in claim 9, wherein said aqueous dispersion is selected from the group consisting of water and oil, water and alcohol, water and essential oils, and mixtures thereof.
34. A process as in claim 6, wherein the carrier having bound thereto a medium which forms gas bubbles is pine wood fibers containing water.
35. A process as in claim 23, wherein said hydrophilic mineral fillers are at least one material selected from the group consisting of kaolin and alumina.

* * * * *